United States Patent
Ziegler, Jr.

[11] Patent Number: 4,478,410
[45] Date of Patent: Oct. 23, 1984

[54] FLEXIBLE SWING SEAT

[75] Inventor: William H. Ziegler, Jr., Bedford, Pa.

[73] Assignee: Brown Group Recreational Products, Inc., Bedford, Pa.

[21] Appl. No.: 418,792

[22] Filed: Sep. 16, 1982

[51] Int. Cl.³ ............................................. A63G 9/00
[52] U.S. Cl. ......................................... 272/85; 294/74
[58] Field of Search .................................... 272/85–92; 403/DIG. 4, 75, 79, 91, 92, 98, 205, 206, 209, 213, 346, 404; 59/11; 119/109, 110, 115, 117, 123, 122; 294/67.4, 67.41, 74

[56] References Cited
U.S. PATENT DOCUMENTS

| | | | |
|---|---|---|---|
| 642,214 | 1/1900 | Enright | 294/74 |
| 1,916,953 | 7/1933 | Jacobsen | 119/115 |
| 1,975,262 | 10/1934 | Evans et al. | 272/85 |
| 3,161,893 | 12/1964 | Siler | 272/85 |
| 3,290,083 | 12/1966 | Norton | 294/74 |
| 3,462,195 | 8/1969 | Allen | 272/85 |
| 3,712,614 | 1/1973 | Sherman et al. | 272/85 |
| 3,897,056 | 7/1975 | Hock et al. | 272/85 |
| 3,966,202 | 6/1976 | Cynamon | 272/85 |

FOREIGN PATENT DOCUMENTS 90393 11/1957 Norway .............................. 294/74

Primary Examiner—Richard C. Pinkham
Assistant Examiner—T. Brown
Attorney, Agent, or Firm—Cesari and McKenna

[57] ABSTRACT

A swing is composed of a flexible strap-like seat formed at its underside with integral lengthwise tubes adjacent its front and rear edges. A pair of chains extend through the tubes. Corresponding first ends of the chains are releasably connected by clips to the opposite chain lengths at locations thereon spaced from the opposite ends of said seat so as to form hangers for maintaining the seat in a level gently curved condition. Corresponding second ends of said chains are suspended from an overhead support.

8 Claims, 2 Drawing Figures

FLEXIBLE SWING SEAT

This invention relates to a swing seat. It relates more particularly to a flexible sling-type swing seat for use on gym sets.

BACKGROUND OF THE INVENTION

The usual swing seat comprises a rigid board or seating platform suspended from an overhead support by flexible connectors such as chain or rope. However, such swings frequently cause injury to unwary children in a position to be struck by the swinging rigid seat. Consequently, of late, there has been a tendency to outfit gym sets with swings having flexible sling-type swing seats which do not cause serious injury when they swing against a child.

One example of a sling-type seat in use today is disclosed in U.S. Pat. No. 3,897,056. Basically, that swing seat comprises a generally rectangular plastic or rubber strap-like seat having a pair of spring straps extending lengthwise along its front and rear edges which tend to maintain the seat in a generally flat condition. A pair of rigid wire hangers are anchored to corresponding ends of those straps at the opposite ends of the seat. A pair of chains hanging down from an overhead support are attached to these hangers to suspend the seat above the ground.

That prior flexible seat has a definite advantage over conventional rigid swing seats in that it does minimize the incidence of injury. However, it still presents some danger to nearby children because of its rigid wire hangers. Morever, that seat is composed of several different parts. Some of these parts such as the spring straps are assembled by the manufacturer which increases manufacturing costs. Other parts, such as the wire hangers have to be assembled to the seat per se using small nuts. Sometimes, these small parts become lost causing inconvenience to the purchaser. Also, when the seat has been in use for a period of time, the hangers and fasteners become rusted, making it difficult to disassemble the swing in the event that becomes necessary.

U.S. Pat. No. 3,352,555 discloses an elastic tube swing seat which consists of a tube having a spring extending therethrough. A bracket is mounted to the top of the tube and to the ends of the spring by which the swing is suspended by a cable from an overhead support. That swing also is a relatively complicated and therefore expensive play item and we suspect that it is for that reason that it has not found its way into the marketplace.

SUMMARY OF THE INVENTION

Accordingly, the present invention aims to provide an improved swing of the flexible sling-type.

Another object of the invention is to provide a swing having a flexible contoured sling-type seat that does not require resilient or nonresilient springs, wire hangers, metal straps or the like.

A further object of the invention is to provide a swing which can be assembled and disassembled entirely by the customer quite easily without requiring any tools.

Still another object of the invention is to provide such a swing which allows lower product cost as compared with those comparable seats requiring manufacturer assembly of supportive seat braces, wire hangers, brackets and other parts.

Another object of the invention is to provide a swing seat which is safe to use and which does not have large rigid parts that could cause injury if the swing should strike a child.

Yet another object of the invention is to provide a swing composed of only three different parts, all of which are easy and inexpensive to manufacture in quantity.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, my improved swing comprises a generally rectangular flexible somewhat resilient seat formed with a pair of integral tubes at the underside of the seat adjacent the longitudinal edges thereof. A pair of substantially identical lengths of chain extend through these seat tubes. Corresponding first ends of the chains are anchored to an overhead support. Corresponding second ends of the chains are removably secured by a pair of identical releasable locking clips to the opposite chains at locations just beyond the opposite ends of the swing seat. This mode of securement forms a pair of chain triangles at the opposite ends of the seat with the clips being located at the apex of the triangles and the seat ends at the bases thereof which tend to maintain the seat in a generally level position.

The seat tubes, being somewhat resilient, tend to bias the unoccupied seat to a gently curved condition so that the two chains are spaced apart at the ends of the seat thereby enabling a child to sit on the seat quite easily. As soon as the seat is sat upon, it flexes assuming a sling-type configuration that conforms to the rider's body and is quite comfortable. As soon as the child leaves the swing, the seat resumes its gently curved shape.

The present seat is safer than prior flexible swing seats of this general type because it does not require wire hangers or other relatively large rigid parts that could strike a child. It also has several additional advantages in that it consists of only three different parts, namely the seat, chain and clip, all of which can be manufactured quite easily. Furthermore, none of these parts have to be assembled by the manufacturer. Consequently, the initial cost of the swing is kept to a minimum. Such assembly as is required can be accomplished by the swing purchaser quite easily and without requiring any tools at all. The user simply inserts the chains through the seat tubes and connects the lower end of each chain to the other chain at a location just beyond an end of the seat using a chain clip.

The purchaser then only has to connect the opposite or upper ends of the two chains to an overhead support such as the horizontal bar of a gym set. The seat is placed at the proper height above the ground by connecting the appropriate chain links at the upper ends of the chains to the overhead support in the usual way.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
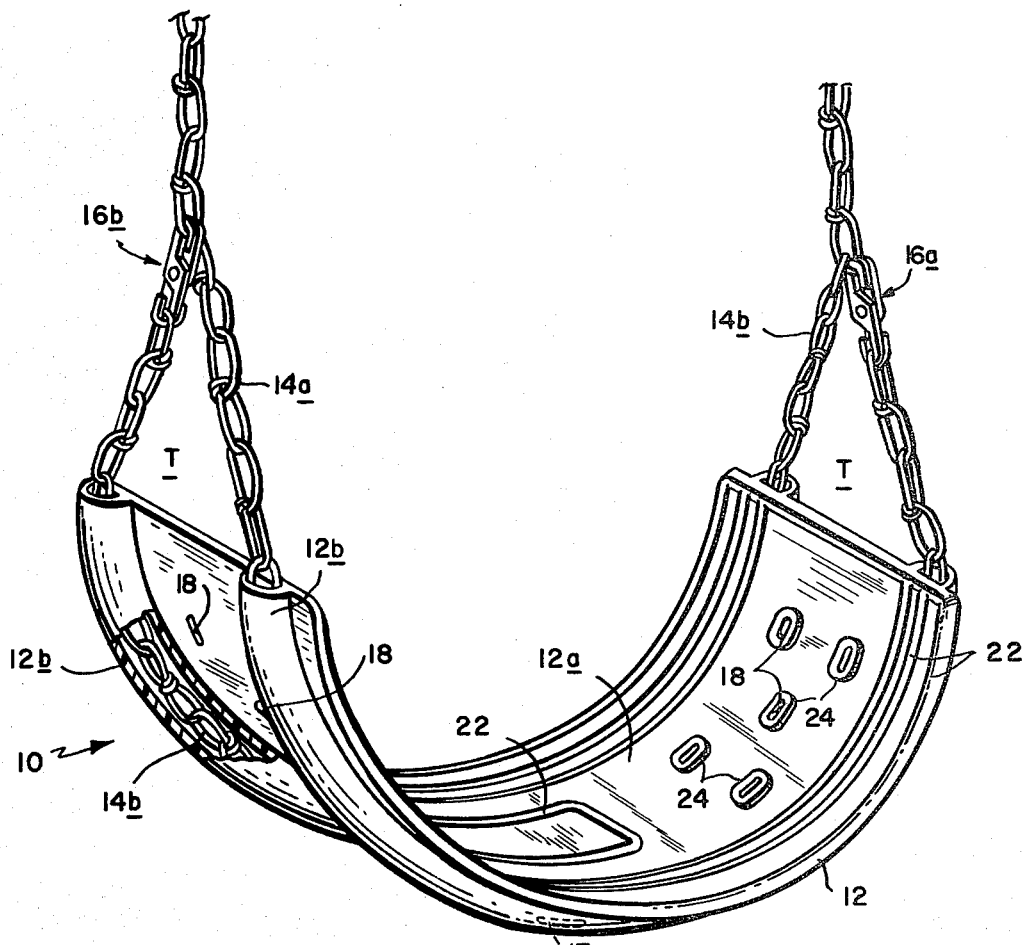
FIG. 1 is a fragmentary perspective view of a flexible swing seat made in accordance with this invention.

Referring to FIG. 1 of the drawing, the seat embodying this invention is indicated generally at 10. It employs a generally rectangular, flexible and somewhat resilient strap-like seat 12. The seat is suspended at the proper height above the ground by a pair of equal length chains 14a and 14b. Corresponding upper ends of the chains are anchored to a suitable overhead support such as a play gym (not shown). The corresponding lower ends of the chains are secured to the opposite chains at locations spaced beyond the opposite ends of seat 12 by a pair of identical releasable locking clips 16a and 16b.

The seat 12 is a unitary part molded or extruded of rubber or a suitable rugged weather-resistant plastic material such as polyethylene. The seat has a generally flat main body 12a. Formed at the underside of that body 12a adjacent the front and rear longitudinal edges thereof are a pair of tubes 12b which extend substantially the entire length of the seat. These tubes are formed integrally with the main body 12a during the molding or extrusion process that forms the seat. If desired, drainage holes may be provided in the bottom walls of the tubes as shown in dotted lines at 17 in FIG. 1.

Arrays of lengthwise openings or slots 18 are provided in the swing body 12a between tubes 12b inboard of the seat ends. These slots provide ventilation. They also increase the flexibility of the seat 12 adjacent the ends thereof where the seat is intended to curve upwardly around the sides of the seat occupant when the seat is in use.

Preferably, the upper surface of the seat 12 is roughened such as by ridges or ribs to reduce the chances of a child slipping off the swing seat. Such ribbing is seen at 22 just inboard of the longitudinal edges of seat 12 and at the center of the seat where it forms a rectangle. Other ridges 24 are shown extending around the slits 18.

As seen from FIG. 1, the left-hand chain 14a extends down from the overhead support through the tube 12b at the forward or leading edge of the seat so that its lower end projects from the right-hand end of the seat. On the other hand, the right-hand chain 14b hanging down from the overhead support extends through the rear seat tube 12b so that its end extends from the left-hand end of the seat. The lower ends of the chains are then connected by clips 16a and 16b to links of the opposite chain at locations spaced from the opposite ends of seat 12. In other words, clip 16a connected to the lower end of chain length 14a is coupled to a link of chain 14b beyond the left-hand end of seat 12, while the clip 16b connected to the lower end of chain length 14b is connected to a link of chain length 14a beyond the left-hand end of the seat.

This mode of connecting the two chains together forms a pair of triangles T at the opposite ends of the seat which function as hangers to maintain the seat 12 in a generally horizontal or level condition as shown in FIG. 1. Furthermore, this allows the seat which is somewhat resilient due to tubes 12b to hang under its own weight thereby assuming a gentle curvature which maintains the chains 14a and 14b in a spaced-apart condition. Resultantly, a child can easily position himself or herself on seat 12 between the two chains. As soon as he or she does so, the seat flexes further under the child's weight so that it engages snugly under and around the child, providing firm and comfortable support as the child swings. It should be noted also that, while the triangle-forming chain segments function as hangers, they can still flex if the swing seat should strike a child. Consequently, unlike rigid wire seat hangers and brackets, they do not present a real danger to children near the swing.

Figure 2:
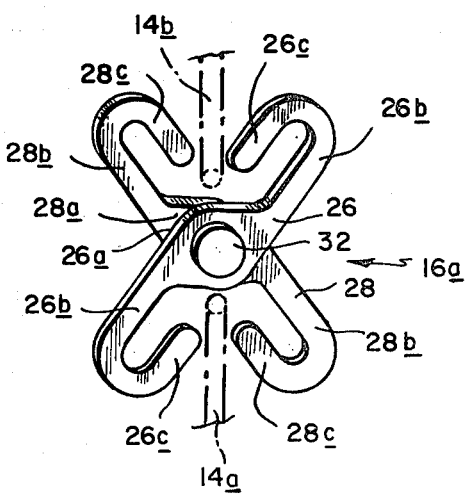
FIG. 2 is a side elevational view on a larger scale showing the clip component of the FIG. 1 seat in greater detail.

Referring now to FIG. 2, clips 16a and 16b are identical, the former being illustrated specifically in that figure. Each clip comprises a pair of arms 26 and 28 connected at the centers by appropriate pivot means such as a rivet 32.

Arm 26 has an enlarged central section 26a through which the rivet 32 extends. A pair of straight segments 26b extend from opposite sides of section 26a. The free ends of these segments turn back on themselves to form hooks 26c. Similarly, arm 28 is composed of a central section 28a, a pair of oppositely extending segments 28b terminated by hooks 28c. The arms are actually identical parts. However, prior to their connection by rivet 32, one of the arms is turned over so that corresponding faces of the two arms abut one another. In other words, the rear face of arm 26 lies flush against the rear face of arm 28. Consequently, each clip is composed of only two different parts, namely an arm which is an inexpensive rigid stamped metal part and a rivet which is an off-the-shelf item. Consequently, the clip can be manufactured quite easily and inexpensively.

As shown in FIG. 2, the clip arms 26 and 28 are arranged so that their hooks oppose one another at the top and bottom of the clip. The two arms 26 and 28 can be pivoted relative to one another between an open position illustrated in FIG. 2 wherein their end hooks are spaced apart to receive links of chains 14a and 14b and a closed position shown in FIG. 1 wherein the two arms are superimposed so that their hooks 26c and 28c overlap one another and capture the chain links.

If desired, the clip arms can be loose enough or spaced apart by a plastic washer (not shown) so that they will pivot readily on rivet 32 even if the metal clip parts should become rusted. Therefore, the swing 10 can always be assembled and disassembled quite easily without any tools. Thus, the clips 16a and 16b can be attached releasably to the appropriate chain links quite easily and when so connected they provide very strong releasable securements between the chains so that there is little danger of the seat 12 collapsing under the rider's weight.

It will thus be seen that the objects set forth above, among those made apparent from the preceding description, are efficiently attained. Also certain changes may be made in the above construction without departing from the scope of the invention. For example, instead of using chain to support the seat 12, other long flexible suspension means can be used such as rope, cable, etc., appropriate loops being provided therein to retain the securing clips. Therefore, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. An improved swing comprising
   A. a flexible strap-like seat composed of
      (1) generally flat main body, and
      (2) a pair of resilient tubes formed integrally with the main body at the underside thereof which tubes extend along the front and rear edges of said main body;
   B. first long, thin, flexible suspension means extending through one seat tube so that an end segment of said means extends from one end of the seat;
   C. second similar suspension means extending through the other seat tube so that an end segment thereof extends from the opposite end of the seat; and
   D. means for connecting the free end of each said segment to the other said suspension means at a location spaced from the adjacent end of the seat so that said connected-together segments and suspension means define flexible triangular hangers at the opposite ends of the seat which maintain said seat in a substantially level condition whereby the seat occupant is supported on top of both said suspension means between the hangers.

2. The swing defined in claim 1 and further including means defining openings through the seat body between said tubes.

3. The swing defined in claim 2 and further including means defining raised ridges extending around said openings.

4. The swing defined in claim 1 and further including means projecting from the upper surface of said seat body for roughening said surface.

5. The seat defined in claim 1 wherein said tubes extend substantially the entire length of said seat body.

6. The seat defined in claim 1 and further including means for supporting the opposite ends of said suspension means at elevated positions above the ground so as to suspend said seat in a level condition at a selected distance above the ground.

7. The seat defined in claim 1 wherein said connecting means are releasable.

8. The seat defined in claim 7 wherein said connecting means comprise clips composed of
   A. a pair of similar arms, each arm defining oppositely directed hooks at its opposite ends; and
   B. means for pivotally connecting said arms intermediate their ends front to back so that the arms can pivot between an open position wherein their adjacent end hooks are spaced apart permitting entry of suspension means therebetween and a closed position wherein said arms are superimposed with their end hooks overlapping to capture said suspension means.

* * * * *